Feb. 6, 1934.  J. E. HOUDASHELT  1,946,164
VEHICLE
Filed Dec. 7, 1931  4 Sheets-Sheet 1
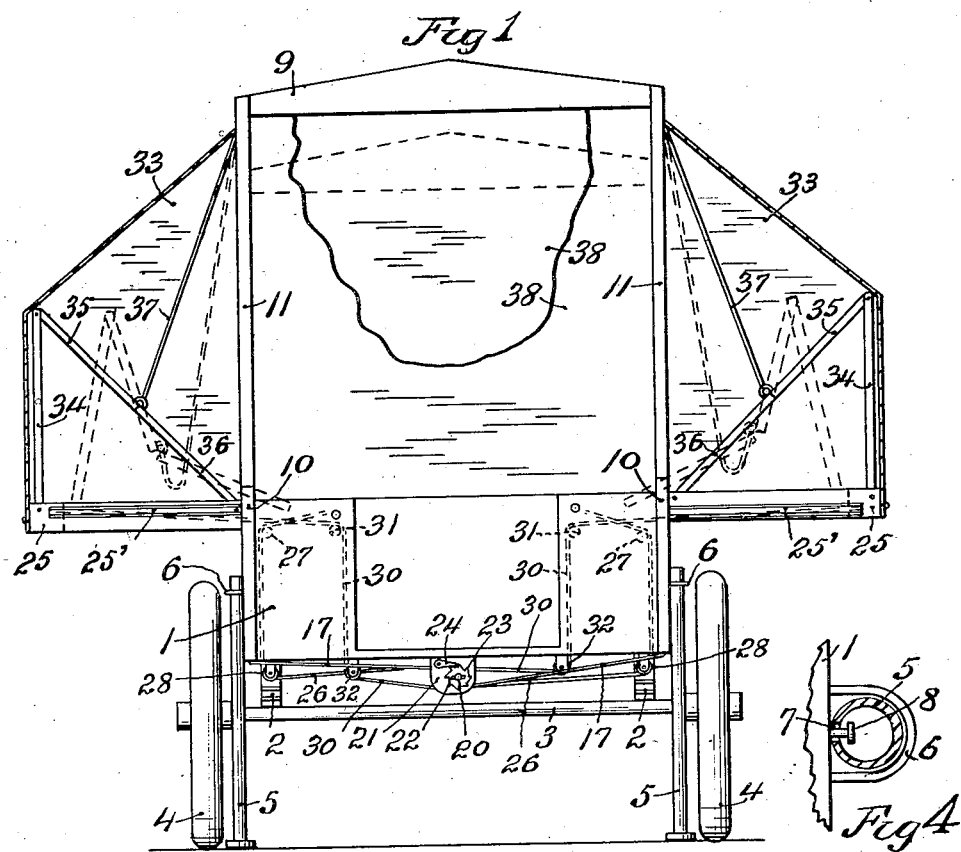
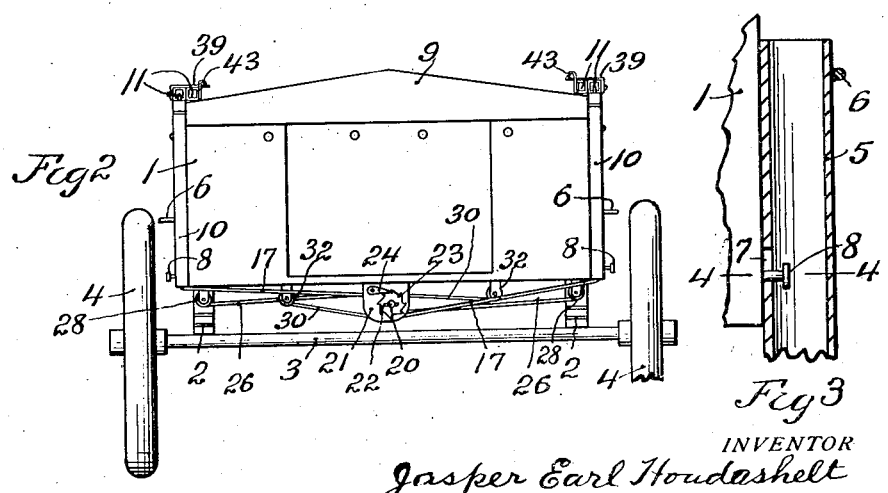
INVENTOR
Jasper Earl Houdashelt
BY Warren W. House
His ATTORNEY
Witness
H. Vernon Olson Feb. 6, 1934.  J. E. HOUDASHELT  1,946,164
VEHICLE
Filed Dec. 7, 1931  4 Sheets-Sheet 2
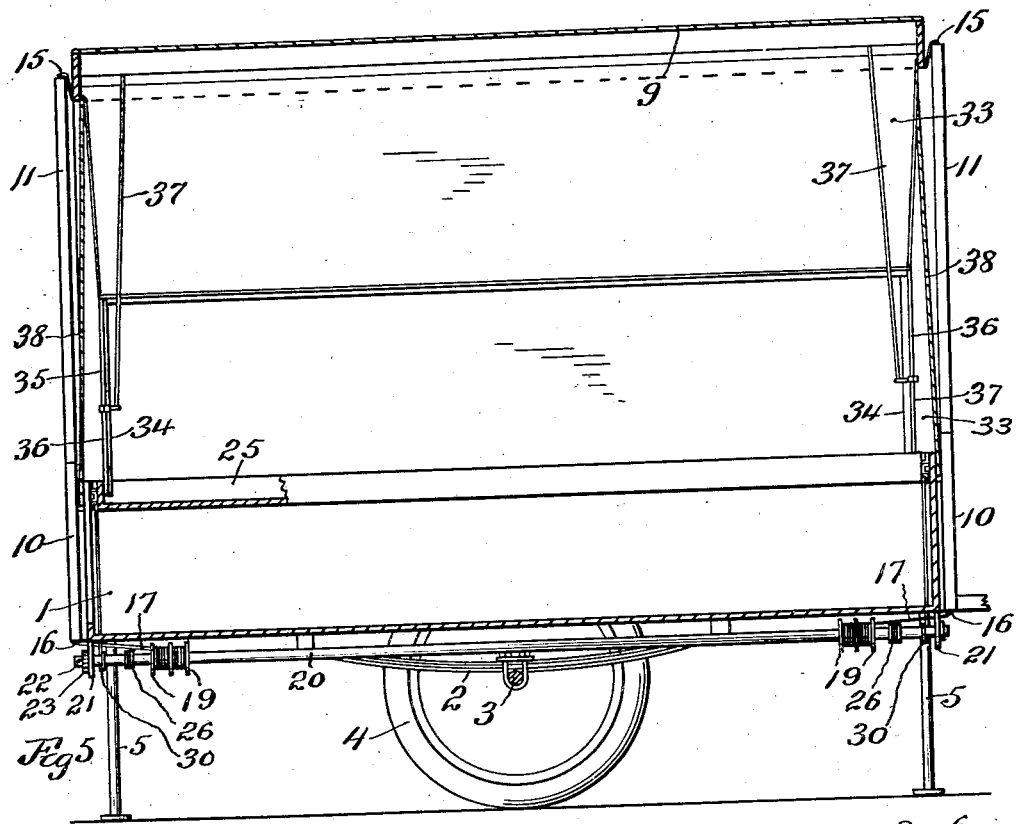
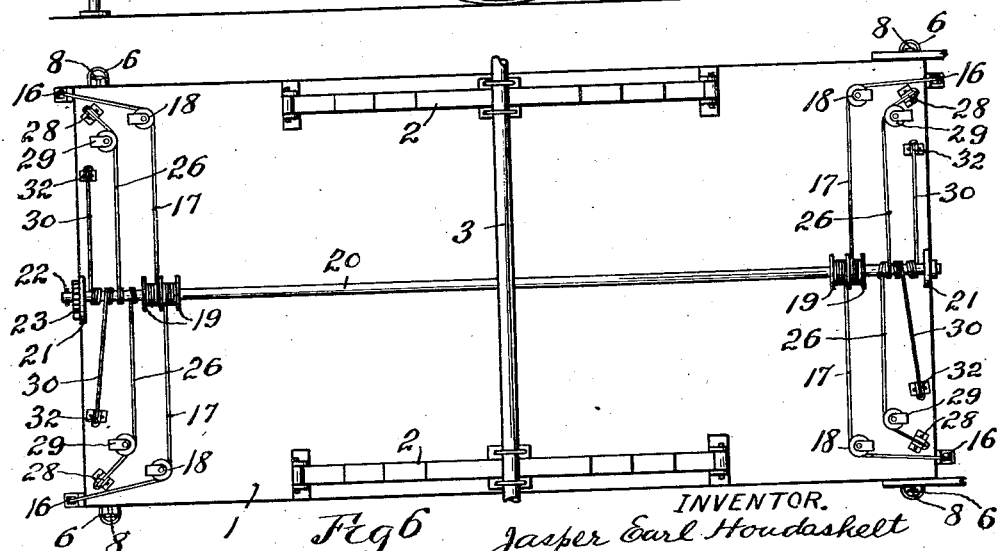
INVENTOR.
Jasper Earl Houdashelt
BY Warren D. House
His ATTORNEY
Witness
H. Vernon Olson

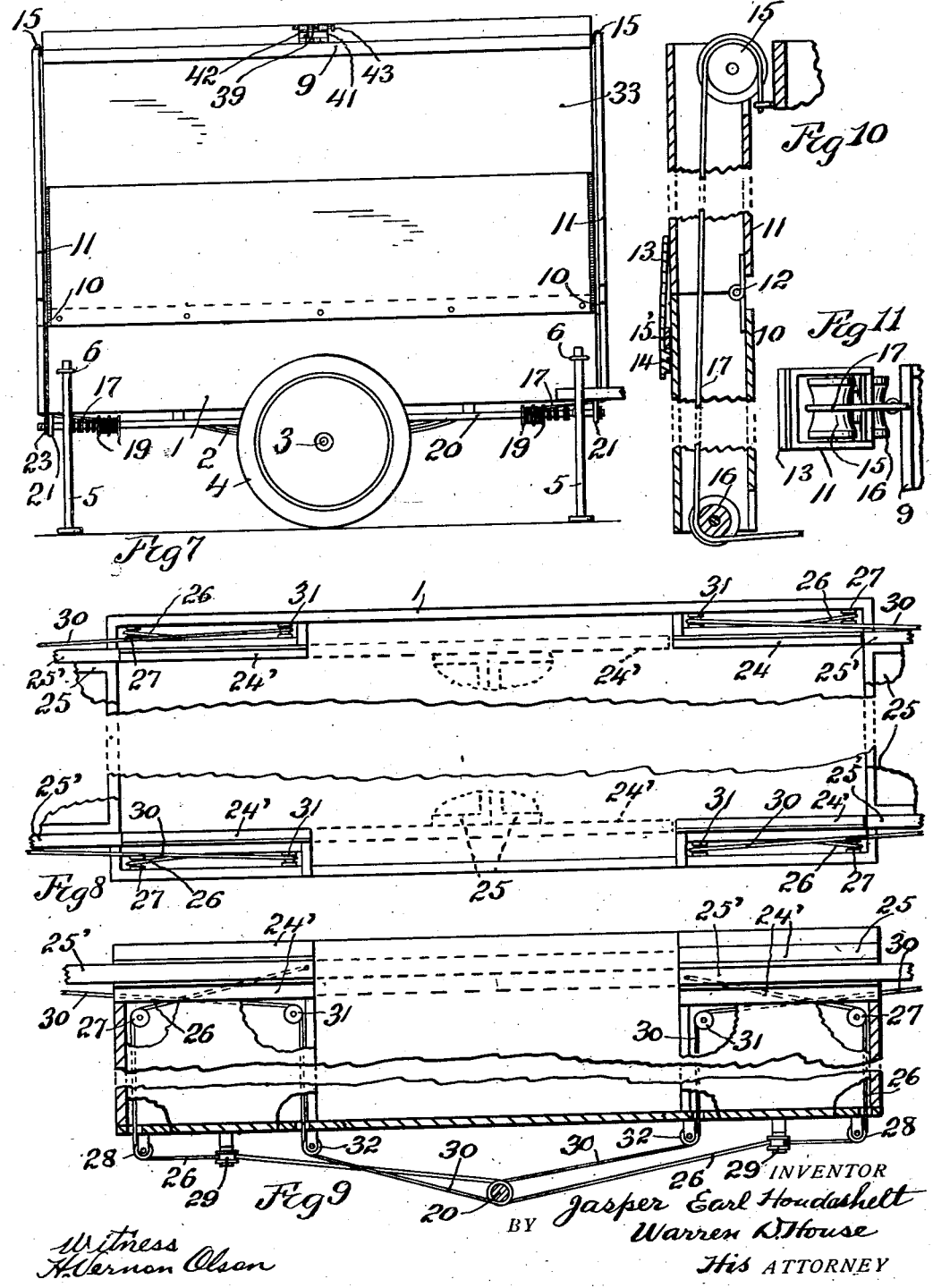

Feb. 6, 1934. J. E. HOUDASHELT 1,946,164
VEHICLE
Filed Dec. 7, 1931 4 Sheets-Sheet 4
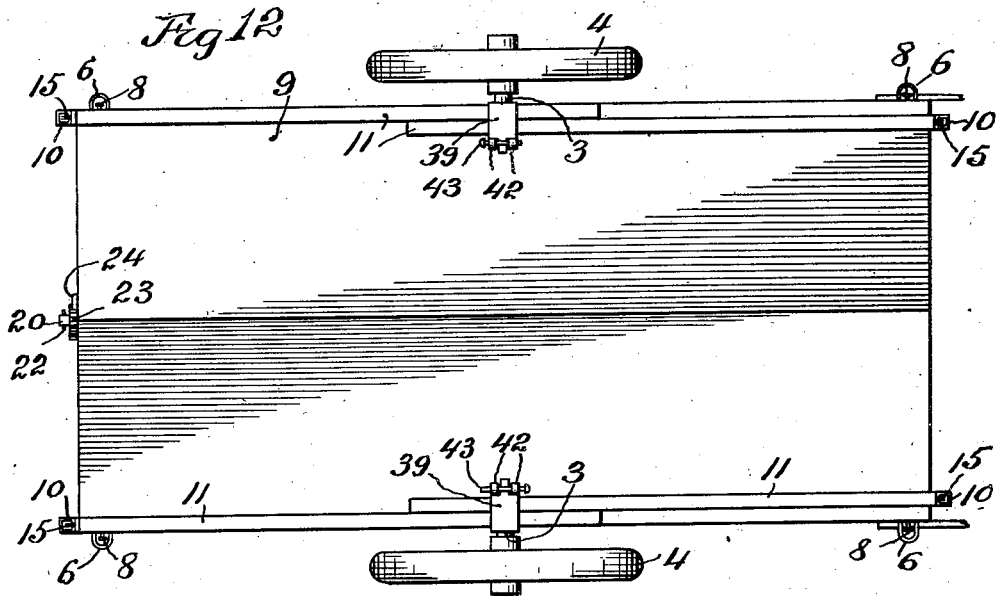
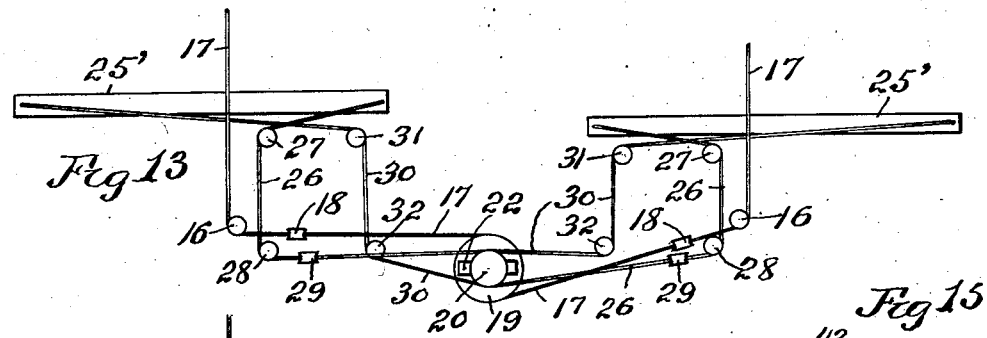
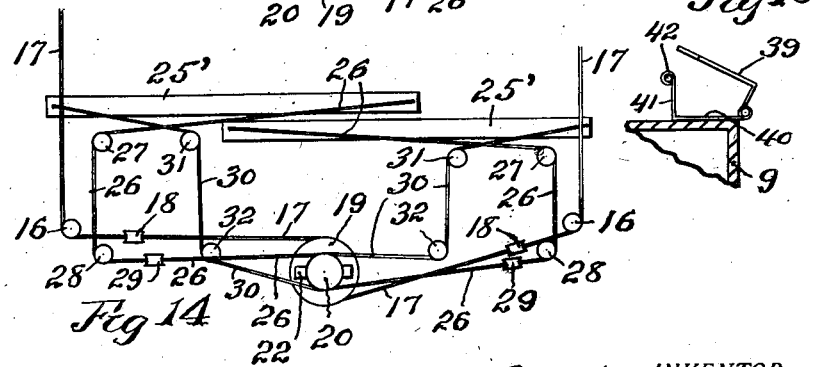
INVENTOR
Jasper Earl Houdashelt
BY Warren D. House
His ATTORNEY
Witness
H. Vernon Olson Patented Feb. 6, 1934

1,946,164

UNITED STATES PATENT OFFICE 1,946,164

VEHICLE

Jasper Earl Houdashelt, Kansas City, Mo.

Application December 7, 1931. Serial No. 579,636

7 Claims. (Cl. 296—23)

My invention relates to improvements in vehicles. It relates particularly to improvements in vans or trailers.

One of the objects of my invention is to provide in a vehicle a roof therefor adapted to be lifted from a lowered to a raised position and in both positions covering the bed of the vehicle.

A further object of my invention is to provide on a vehicle bed a member adapted to serve as a couch or seat movable laterally to a horizontal position projecting outwardly from the bed.

A further object of my invention is to provide novel means by which the roof is raised and lowered and the seat or couch member moved to and from the projecting position.

My invention provides further a side cover connected with the roof and seat or couch member with means by which the cover is tightened when the roof is raised.

My invention provides still further novel means by which the roof is supported in its raised position.

My invention provides further a construction which is simple, relatively cheap, durable, not likely to get out of order, and which is efficient in its operation.

The novel features of my invention are hereinafter fully described and claimed.

In the accompanying drawings illustrative of my invention,

Fig. 1 is a rear elevation, partly broken away, of my improved vehicle, with the roof raised and the couch or seat members in the projecting positions.

Fig. 2 is a rear elevation of the vehicle with the roof lowered and the couch or seat members retracted.

Fig. 3 is an enlarged vertical section of the upper part of one of the supporting legs, and a part of the bed in elevation.

Fig. 4 is a section, looking upwardly, on the line 4—4 of Fig. 3.

Fig. 5 is a longitudinal view of the vehicle, partly in vertical section and partly in elevation, showing the roof raised.

Fig. 6 is a bottom view of the bed and parts connected therewith and partly broken away.

Fig. 7 is a side elevation of the vehicle with the roof raised.

Fig. 8 is a plan view, partly broken away, of the bed and some of the parts connected therewith, with the couch or seat members shown in solid lines in the projecting position and shown in dotted lines in the retracted position.

Fig. 9 is a rear view, partly in vertical section, partly in rear elevation and partly broken away, of the bed and parts connected therewith.

Fig. 10 is an enlarged vertical section, partly broken away, of one of the corner posts or standards in the upright position, and parts connected therewith.

Fig. 11 is a top view of what is shown in Fig. 10.

Fig. 12 is a top view of the vehicle with the roof lowered and the couch or seat members retracted.

Fig. 13 is a diagrammatic view of the couch or seat members, shown projected, and parts of the mechanism for lifting the roof and projecting the couch or seat members.

Fig. 14 is a view similar to Fig. 13, with the couch or seat members shown retracted.

Fig. 15 is an enlarged side elevation of one of the clamps for holding the swinging standard members to the lowered roof.

Similar characters of reference designate similar parts in the different views.

1 designates a bed of a vehicle adapted to serve as a trailer attached to the rear end of an automobile, and supported on springs 2 mounted on an axle 3, which is carried by two carrying wheels 4.

To prevent the bed tilting, when the trailer is standing and not attached to the automobile, four tubular posts 5 are removably attachable to the bed 1, two in front of the wheels 4 at opposite sides of the bed, and two at the rear of the wheels at opposite sides respectively of the bed, as shown in Figs. 1, 3, 4, 5 and 7.

As shown in Figs. 3 and 4, the upper end of each post 5 is adapted to be extended upwardly into a staple 6 mounted on the outer side of the bed 1 adjacent to one corner thereof. The post has a lateral hole 7 adapted to receive the headed end of a spike 8 mounted in the bed 1 below the adjacent staple 6. The lower ends of the posts 5 are adapted to rest on the ground. When traveling, the posts 5 are removed.

9 designates a roof extending substantially the length and width of the bed 1 which it covers, and movable to and from a raised position over the bed.

For raising and lowering the roof 9 and for holding it in the elevated position, shown in Figs. 1, 5 and 7, collapsible supporting means are mounted on the bed 1, flexible means having running connections with said supporting means, and manually operable means for actuating the flexible means to raise and support the roof are provided.

Such collapsible supporting means comprises, as shown, the following described parts.

Four tubular folding standards have their lower stationary vertical portions 10 fastened to the outer side of the bed 1 respectively adjacent to the four corners of the bed. Each of the upper swinging portions 11 of said standards is connected by a hinge 12, Fig. 10 to the upper end of the adjacent stationary lower portion 10.

The hinge 12 of each standard is arranged to permit the upper portion 11 to swing to a horizontal position lengthwise of the bed 1, after the roof 9 has been lowered, the two rear portions 11 swinging forwardly and the two front portions 11 swinging rearwardly, to the positions shown in Fig. 12.

To retain each upper portion 11 of the standards in the erect position, shown in Figs. 1, 5, 7 and 10, each upper portion 11 has fastened to the side, opposite that to which the hinge 12 is connected, the upper end of a spring latch plate 13 having on its inner side a shoulder 14 adapted, when the portion 11 is raised to the erect position, to releasably lockingly engage a plate 15' fastened to the outer side of the lower portion 10 of the standard, Fig. 10.

Mounted respectively in the upper ends of the upper portions 11 are pulleys 15. In the lower portions of the members 10 are respectively mounted pulleys 16. Figs. 1, 5, 6, 7, 10, 11, 12 and 13.

For lifting and lowering the roof 9, four cables 17 have one set of ends fastened to the roof 9 respectively adjacent to the corners thereof. These cables 17 respectively extend over and have running engagement with the pulleys 15 and 16 and extend respectively through the standard portions 10 and 11, and have running engagement with four pulleys 18 fastened to the under side of the bed 1, Fig. 6, the other ends of the cables being respectively attached to and adapted to be wound upon four drums 19 fastened to and revoluble with a central longitudinal manually operable shaft 20 rotatable in both directions in bearings 21 fastened to the under side of the bed 1, Figs. 5 and 6.

The rear end of the shaft 20 is provided with a transverse projecting pin 22, Fig. 1, adapted to be engaged by a wrench, not shown, so that the shaft may be turned in both directions for winding the cables 17 upon and unwinding them from the drums 19.

To hold the roof 9 elevated and the shaft 20 from being rotated by the weight of the roof, a ratchet wheel 23 fastened on the shaft 20 is normally releasably engaged by a pawl 24 pivoted to the adjacent bearing 21, Figs. 1 and 2.

Two horizontal flat members 25, which extend to near the ends of the bed 1, and which are adapted to form seats or couches, are each provided at its ends with two transverse horizontal channel bars 25', each of which is horizontally slidable between transverse angle bar guides 24' from positions within the bed 1 to positions projecting outside the bed 1, as shown in Fig. 13, and in solid lines in Figs. 8 and 9. The bars 25' on one member 25 are in a plane higher than the other bars 25', so that, when retracted to the inner position, the bars 25' of one member 25 will overlap the other bars 25', as shown in Fig. 14 and in dotted lines in Fig. 9.

To move the members 25 to the projecting positions at the same time the roof 9 is lifted, cables 26 are respectively attached to the outer ends of the channel members 25', Figs. 13 and 14, and have each running engagement with a set of pulleys 27, 28 and 29 on the bed 1, the other ends of the cables 26 being attached to and adapted to be wound on the shaft 20, when the latter is turned clockwise as seen in Fig. 1. The pulleys 27 are disposed so that the cables 26 pull the members 25, and their supporting bars 25', outwardly.

To retract the bars 25' and the couch or seat members 25, when the roof 9 is lowered, the bars 25' have respectively attached to them near their inner ends cables 30, each of which has running engagement with pulleys 31 and 32 on the bed 1. The other ends of the cables 30 are attached to and adapted to be wound on the shaft 20, when the pawl 24 is disengaged from the ratchet wheel 23 and the shaft 20 is turned counter clockwise, as viewed in Fig. 1.

To cover the couch or seat members 25 when they are projecting, there are provided two sheets of waterproofed material, such as canvas 33, the upper edges of which are attached respectively to the eaves of the roof 9, and the lower edges of which are attached to the outer edges of the members 25 and to the ends of the latter.

To stretch the sheets 33, when the members 25 are projecting, each member 25 has pivoted to it one set of ends of two rods 34, which are adapted to be swung from horizontal positions over the member 25 to vertical positions, as shown in Fig. 1. To swing each pair of rods 34 to the vertical position, the upper ends of each pair have pivoted to them respectively two rods 35, which are respectively pivoted to the outer ends of two rods 36, the inner ends of which are pivoted to the adjacent member 25 near the inner edge thereof, Fig. 1. Cables 37 having their lower ends respectively secured to the rods 35 and 36 where the latter are hinged together, the upper ends of the cables 37 being secured to the roof 9.

When the roof is down, the rods 34, 35 and 36 will be disposed horizontally, and when the roof is lifted, the cables 37 will swing the rods 35 and 36 into alinement with each other, and into an upwardly and outwardly inclined position, as shown in solid lines in Fig. 1. The rods 36 will swing the rods 34 to the vertical position, shown in Fig. 1, thus stretching the canvas sheets 33 and causing them to form the tops, sides and ends of two compartments over the members 25.

For closing the central compartment over the bed 1, there are provided two sheets of material, such as water proofed canvas 38, said sheets being attached at their upper edges respectively to the front and rear ends of the roof 9, their lower edges being fastened to the bed 1 at the front and rear thereof.

To lift the roof 9, move the couch or seat members 25 outwardly, and to cause the cables 37 to operate the rods 34, 35 and 36 to stretch the side sheets or curtains 33, the pawl 24 is engaged with the ratchet wheel 23 and the shaft 20 turned clockwise, as seen in Fig. 1, thus winding the cables 17 on the drums 19 to lift the roof 9, the upper standard members 11 having been previously swung to their upright positions. The shaft 20 in turning will wind thereon the cables 26 so as to move the couch or seat members 25 to their projecting positions, Fig. 1. The upward movement of the roof 9, and the outward movement of the members 25 will actuate the cables 37 to operate the rods 34, 35 and 36 to stretch the sheets 33.

To lower the roof 9 and retract inwardly the members 25, the pawl 24 is released from the ratchet wheel 23 and the shaft 20 is turned counter clockwise. Gravity will cause the roof 9 to descend, and the cables 30 will retract the members 25 to their positions within the bed 1. The pawl 24, when engaged with the ratchet wheel 23 will hold the shaft 20 from being turned by the weight of the roof 9 on the cables 17, thus holding the roof elevated.

When the roof is lowered, the standard members 11 are swung to their horizontal positions over the roof, as shown in Figs. 2 and 12, in which positions they can be held by two hasps 39 respectively pivoted to two plates 40 fastened to the top of the roof 9, respectively adjacent to the eaves thereof, and provided each with an upstanding portion 41 having two eyes 42 under which the hasp 39 is adapted to be extended over the two adjacent members 11, the eyes 42 being adapted to receive therethrough a pin 43 which extends over the adjacent closed hasp 39, Figs. 2, 7, 12 and 15.

Upon attaching the trailer to the automobile and removing the posts 5, the trailer will be in condition for travel.

Many modifications of my invention, within the scope of the appended claims, may be made without departing from the spirit of my invention.

What I claim is:—

1. In a vehicle, a vehicle bed, standards, means pivotally connecting said standards with said bed upon which said standards may be swung to and from the vertical position, a roof over said bed, and means supported by said standards when the latter are in the vertical position for raising and lowering said roof.

2. In a vehicle, a vehicle bed, standards, means pivotally connecting said standards with said bed upon which said standards may be swung to and from the vertical position, a roof over said bed, and means including flexible means having running engagement with and supported by said standards for raising and lowering said roof.

3. In a vehicle, a vehicle bed, standards, means pivotally connecting said standards with said bed upon which said standards may be swung to and from the vertical position, a roof over said bed, a rotary member on said bed, and flexible means attached to said roof and having running engagement with and supported by said standards when the latter are in the vertical position and attached to and adapted to be wound on said rotary member for raising said roof and to be unwound therefrom for lowering said roof.

4. In a vehicle, a vehicle bed, tubular standards, means pivotally supporting said standards on said bed on which the standards may be swung to and from the vertical position, means for releasably locking said standards in the vertical position, a roof over said bed, and means including flexible means extending through, having running engagement with and supported by said standards for raising and lowering said roof.

5. In a vehicle, a vehicle bed, tubular standards, means pivotally connecting said standards with said bed upon which said standards may be swung to and from the vertical position, pulleys respectively supported by said standards, a roof over said bed, a rotary member on said bed, and means including flexible means supported by and having running engagement with said pulleys and attached to and adapted to support and raise and lower said roof, extending through said standards and attached to and adapted to be wound upon said rotary member for raising said roof and to be unwound therefrom for lowering said roof.

6. In a vehicle, a vehicle bed, a roof over said bed, means for raising and lowering said roof, a couch or seat member movable to and from a position projecting outwardly from said bed, a side cover attached to said seat or couch and attached to and movable with said roof, a stretching member movable on said seat or couch from a horizontal position to an upright position engaging and stretching said cover, bracing means movable to and from a position in which it will hold said stretching member in the upright position, and means connecting said roof and said bracing means by which the bracing means is moved by said roof to the bracing position when said roof is raised.

7. In a vehicle, a vehicle bed, a roof over said bed, means for raising and lowering said roof, a couch or seat member movable to and from a position projecting outwardly from said bed, a side cover attached to said seat or couch member and attached to and movable with said roof, a stretching member movable on said seat or couch member from a horizontal position to an upright position engaging and stretching said cover, folding bracing means connected to said stretching member and to said couch or seat member arranged in its extended position to hold said stretching member in the upright position, and means connecting said roof and said bracing means by which the latter is moved to the extended position when said roof is raised.

JASPER EARL HOUDASHELT.